Oct. 29, 1946.  A. Z. HOYER  2,410,031
THERMOHYDROMETER
Filed Nov. 17, 1944
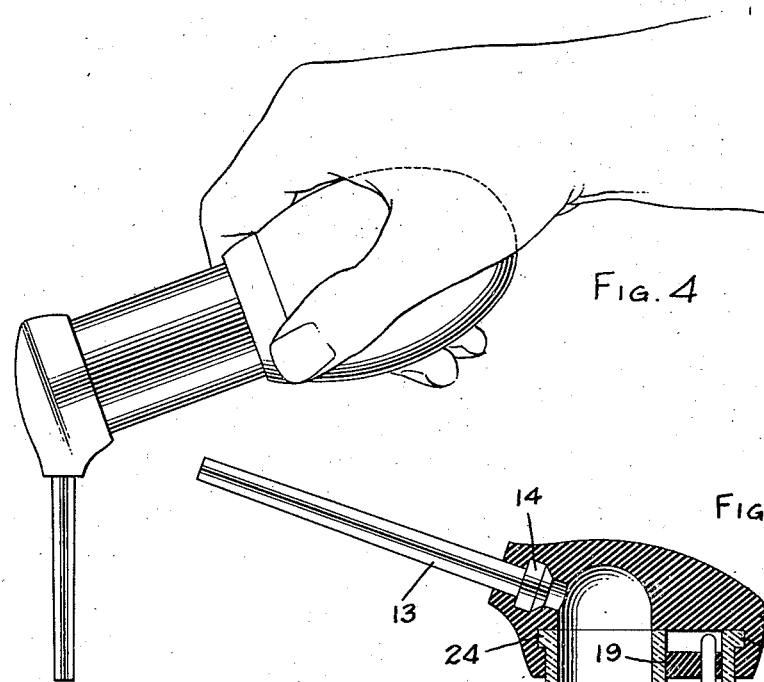
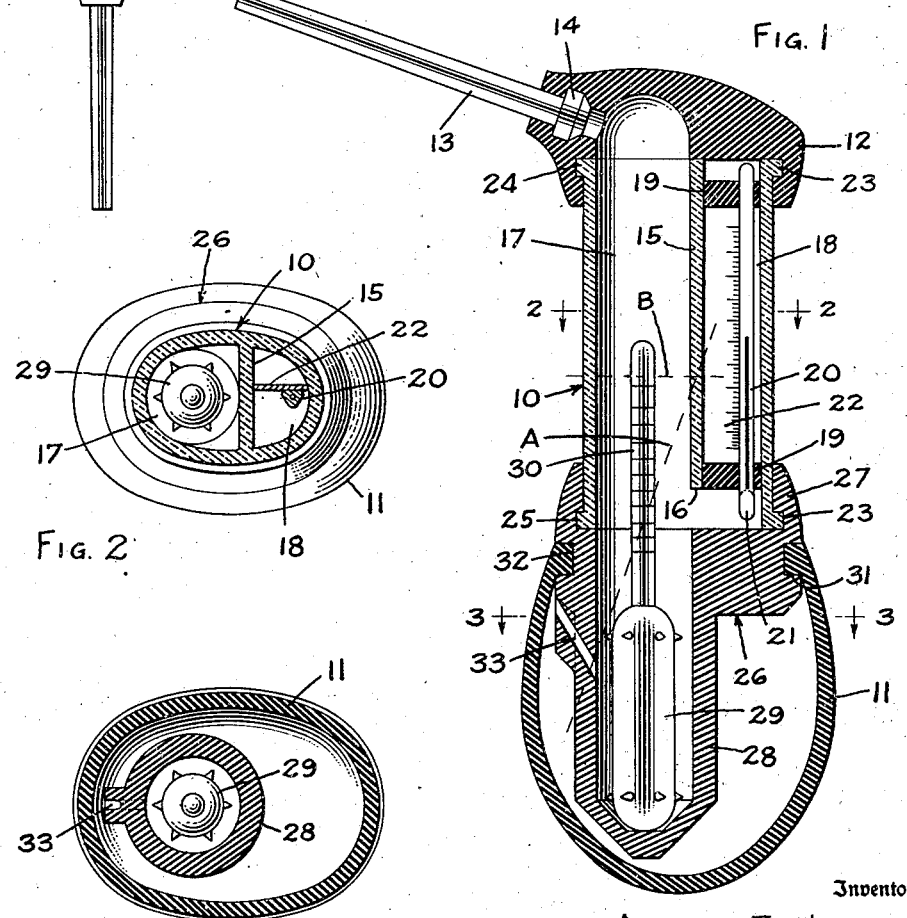
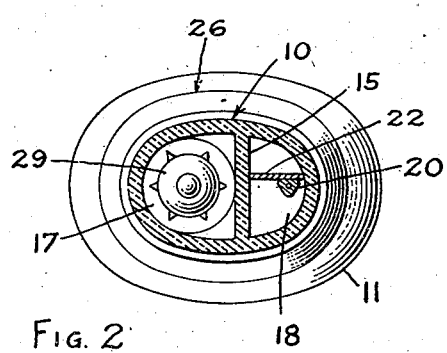
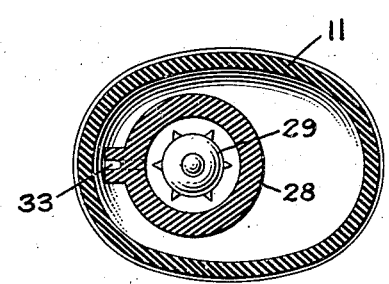
Inventor
ARNOLD Z. HOYER
By George A. Segnan
Attorney Patented Oct. 29, 1946

2,410,031

UNITED STATES PATENT OFFICE 2,410,031

THERMOHYDROMETER

Arnold Z. Hoyer, Conshohocken, Pa., assignor, by mesne assignments, to Kimble Glass Company, Vineland, N. J., a corporation of Delaware Application November 17, 1944, Serial No. 563,950

6 Claims. (Cl. 73—33)

The present invention relates to thermohydrometers and more particularly to a hydrometer in which the barrel and float are positioned above the hand held bulb when being read. The conventional thermohydrometer employed for testing antifreeze solutions in the radiators of motor vehicles or battery testers is held in such a way that the user's hand, grasping the bulb, is above the float, requiring the raising of one's arm if the float and thermometer are brought to the level of the eyes. This necessitates awkward handling of the hydrometer. The present thermohydrometer is so designed that the user's arm is raised only a short distance to permit reading of the indicating elements.

One of the objects of the invention is so to assemble a thermohydrometer that, in its reading position, the bulb is disposed below the barrel and thermometer housing and the nozzle is attached to the upper end of the barrel.

Another object of the invention is the provision of a vent designed to permit passage of air between the barrel and the bulb but which prevents ready flow of liquid from the barrel to the bulb.

Other objects will be apparent from the following description of the invention taken in connection with the accompanying drawing in which Fig. 1 is a longitudinal sectional view of a preferred form of the invention;

Fig. 2 is a transverse section taken on line 2—2 of Fig. 1;

Fig. 3 is a transverse section taken on line 3—3 of Fig. 1; and

Fig. 4 illustrates the manner in which the hydrometer is held while being used to withdraw a sample of the solution to be tested.

In the drawing, the thermohydrometer is shown as including a barrel 10, a collapsible bulb 11 and nozzle cap 12, the barrel being formed from glass or transparent plastic while the bulb and cap are molded from resilient rubber. Nozzle 13 having a head 14 thereon is attached to the cap and disposed angularly with respect to the barrel. The barrel is oblong in section and is formed with a partition wall 15, one end 16 of which is spaced from that end of the barrel to which it is adjacent. The partition divides the barrel into a float chamber 17 and a thermometer housing 18, the latter being closed near its ends by plugs 19. Each of the plugs is apertured to receive and support thermometer 20 having a bulb 21 at its lower end exposed to solution in the barrel. Adjacent the rear side of the thermometer is a scale 22 to indicate temperatures.

The housing 18 is sealed against ingress of the solution in the barrel so that the portion of the thermometer in front of scale 22 may be readily seen and the scale read without interference from the solution which might be discolored. As will be seen from Fig. 1, the barrel is provided at its ends with outwardly flaring beads 23, one of which fits in groove 24 in the nozzle cap and the other with groove 25 in a molded rubber well member 26. The well member consists of a bulb and barrel supporting portion 27 having a substantially elliptical cross section and a cylindrical well portion 28 depending therefrom. A float 29 having a graduated indicating stem 30 is supported in and guided by the well portion of the member. The well member is also provided with a groove 31 with which a bead 32 on bulb 11 cooperates to hold the bulb on the member.

It will be seen that a vent passage 33 provides communication between the well and the bulb. This passage is relatively small in diameter so that, due to capillary attraction, it is difficult for liquid to pass from the well into the bulb. At the same time when the hydrometer is held in the position shown in Fig. 4 air will readily flow from the well to the bulb as the latter expands. Vent 33 is inclined downwardly towards and with respect to the axis of the well, its mouth being adjacent the groove 31 on the well member. The level of the liquid in the barrel when the nozzle is positioned vertically downward to withdraw a sample is indicated by the line A in Fig. 1 and its level when the hydrometer is righted to read the indicator scales is indicated by the line B in Fig. 1.

It will be apparent from the foregoing description of the invention that the hydrometer is tilted as shown in Fig. 4 to withdraw a sample of solution for test, and, after the sample has partially filled the barrel, the hydrometer is righted to the position shown in Fig. 1. The hydrometer is held by the hand of the user grasping the bulb 11 so that the indicating scales may be read without holding one's hand above the eyes.

Should a small amount of liquid leak through the vent passage, the hydrometer can be inverted to collect this liquid at the mouth of the vent and the liquid forced through the vent into the well by squeezing the bulb.

A preferred form of the invention has been illustrated and described but it is intended that modifications thereof, falling within definition of the hydrometer as expressed in the claims, be included.

Having described my invention, what I claim as new and desire to secure by Letters Patent is:

1. A thermohydrometer comprising a barrel, a collapsible bulb, a nozzle, said bulb and said nozzle being carried by and in communication with opposite ends of said barrel, a member having a well therein for retaining liquid to be tested, and a float comprising a buoyant body portion and a graduated stem, said buoyant portion being positioned in and guided by said well, said well being disposed within said bulb and communicating with said barrel, said nozzle being uppermost when the thermohydrometer is positioned for reading of said stem.

2. A thermohydrometer comprising a barrel, a nozzle carried by one end of said barrel, a collapsible bulb, a member having a well therein for retaining liquid to be tested, said bulb and said member being carried by the other end of said barrel, said nozzle and said well communicating with said barrel, said member having a passage providing communication between said well and said bulb, said well being disposed within said bulb, and a float comprising a buoyant body portion and a graduated stem, said buoyant portion being positioned in and guided by said well, said nozzle being uppermost when the thermohydrometer is positioned for reading of said stem.

3. A thermohydrometer comprising a barrel, a nozzle carried by one end of said barrel, a member having a well therein for retaining liquid to be tested and carried by the other end of said barrel, a collapsible bulb carried by said member, said nozzle and said well communicating with said barrel, said member having a passage providing communication between said well and said bulb, said well being disposed within said bulb, and a float comprising a buoyant body portion and a graduated stem, said buoyant portion being positioned in and guided by said well, said nozzle being uppermost when the thermohydrometer is positioned for reading of said stem.

4. A thermohydrometer comprising a barrel, a nozzle carried by one end of said barrel, a member having a well therein for retaining liquid to be tested and carried by the other end of said barrel, a collapsible bulb carried by said member, said nozzle and said well communicating with said barrel, said member having a passage providing communication between said well and said bulb, said passage being inclined to the axis of said well with its mouth adjacent the connection between said bulb and said member, said well being disposed within said bulb, and a float comprising a buoyant body portion and a graduated stem, said buoyant portion being positioned in and guided by said well, said nozzle being uppermost when the thermohydrometer is positioned for reading of said stem.

5. A thermohydrometer comprising a barrel, a nozzle cap carried by one end of said barrel, a nozzle carried by said cap, a collapsible bulb, a member having a cylindrical well therein for retaining liquid to be tested, said bulb and said member being carried by the other end of said barrel, said nozzle being angularly disposed with respect to the axis of said well, said nozzle and said well communicating with said barrel, said member having a passage providing communication between said well and said bulb, said well being disposed within said bulb, and a float comprising a buoyant body portion and a graduated stem, said buoyant portion being positioned in and guided by said well, said nozzle being uppermost when the thermohydrometer is positioned for reading of said stem.

6. A thermohydrometer comprising a barrel, a collapsible bulb, a nozzle, said bulb and said nozzle being carried by and in communication with opposite ends of said barrel, a member having a well therein for retaining liquid to be tested, and a float having a buoyant body portion and a reduced stem indicating portion, said float being positioned with its body portion in and guided by said well and its indicating stem in said barrel, said well being disposed within said bulb and communicating with said barrel, said nozzle being uppermost when the thermohydrometer is positioned for reading of said stem.

ARNOLD Z. HOYER.